Figure 1:
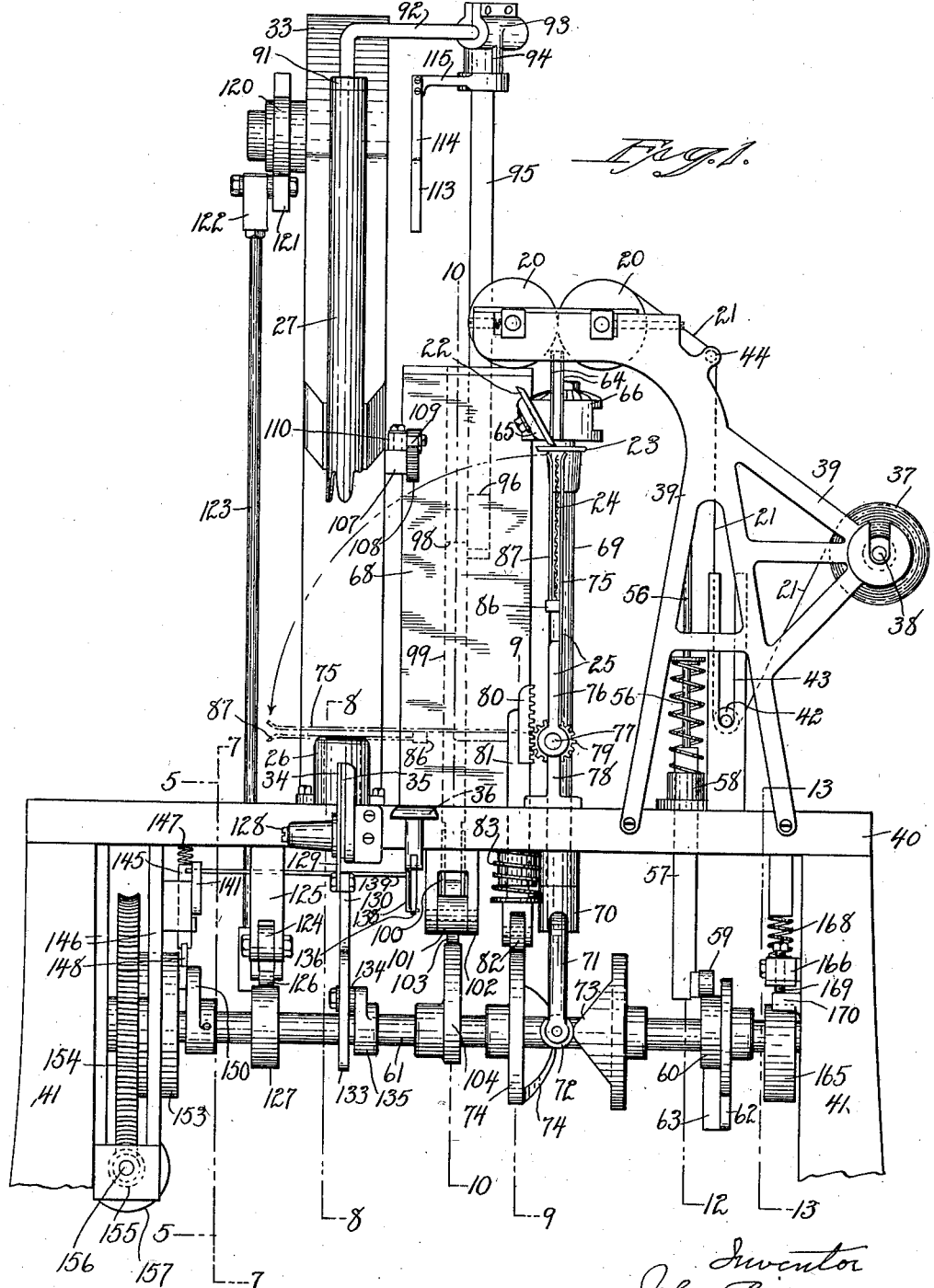

Nov. 24, 1925.

J. PIERCE 1,563,106

TEA BALLING MACHINE

Filed Aug. 7, 1924      8 Sheets-Sheet 1

Inventor
John Pierce
by Seymour Earle
Atty

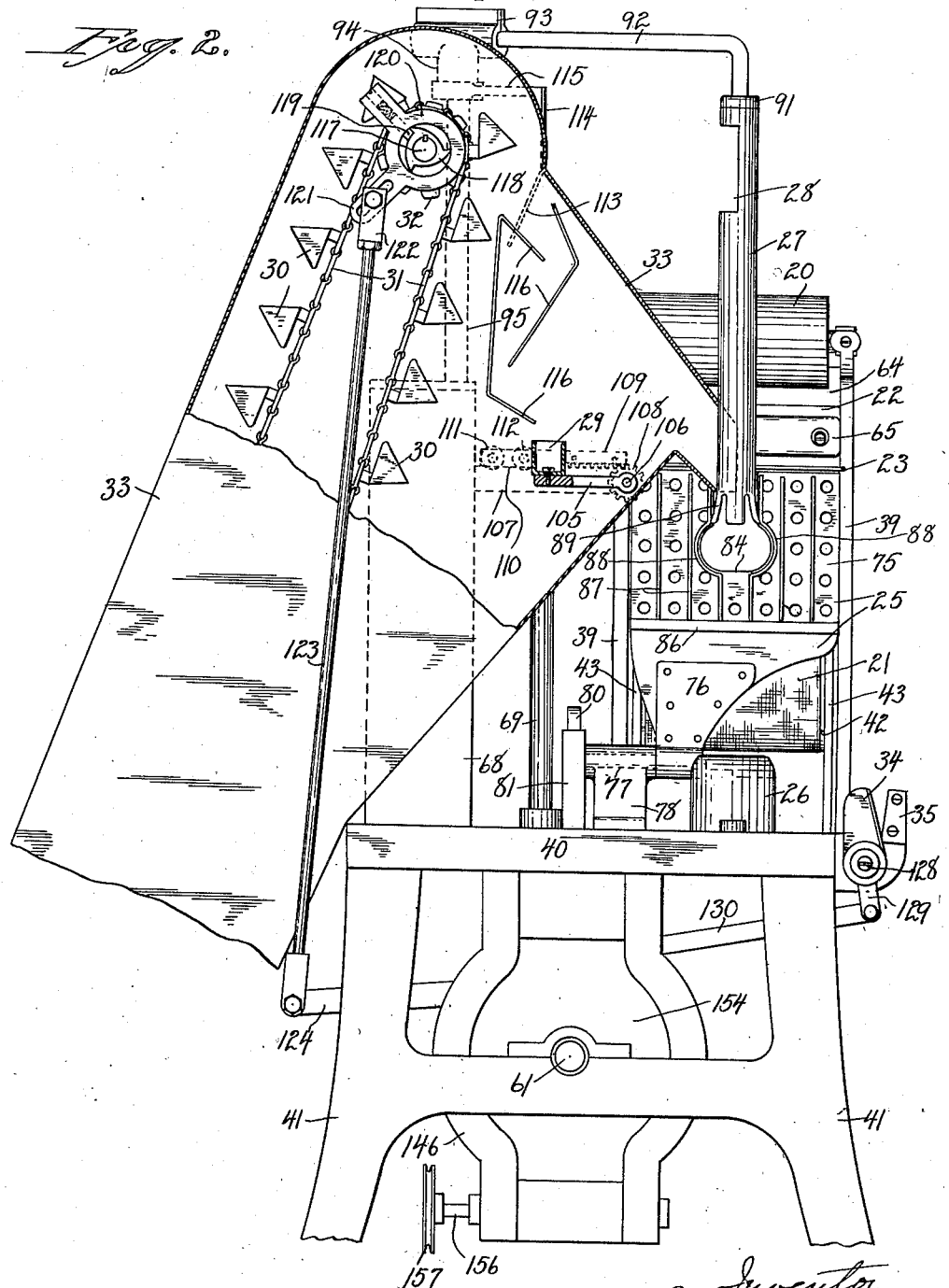

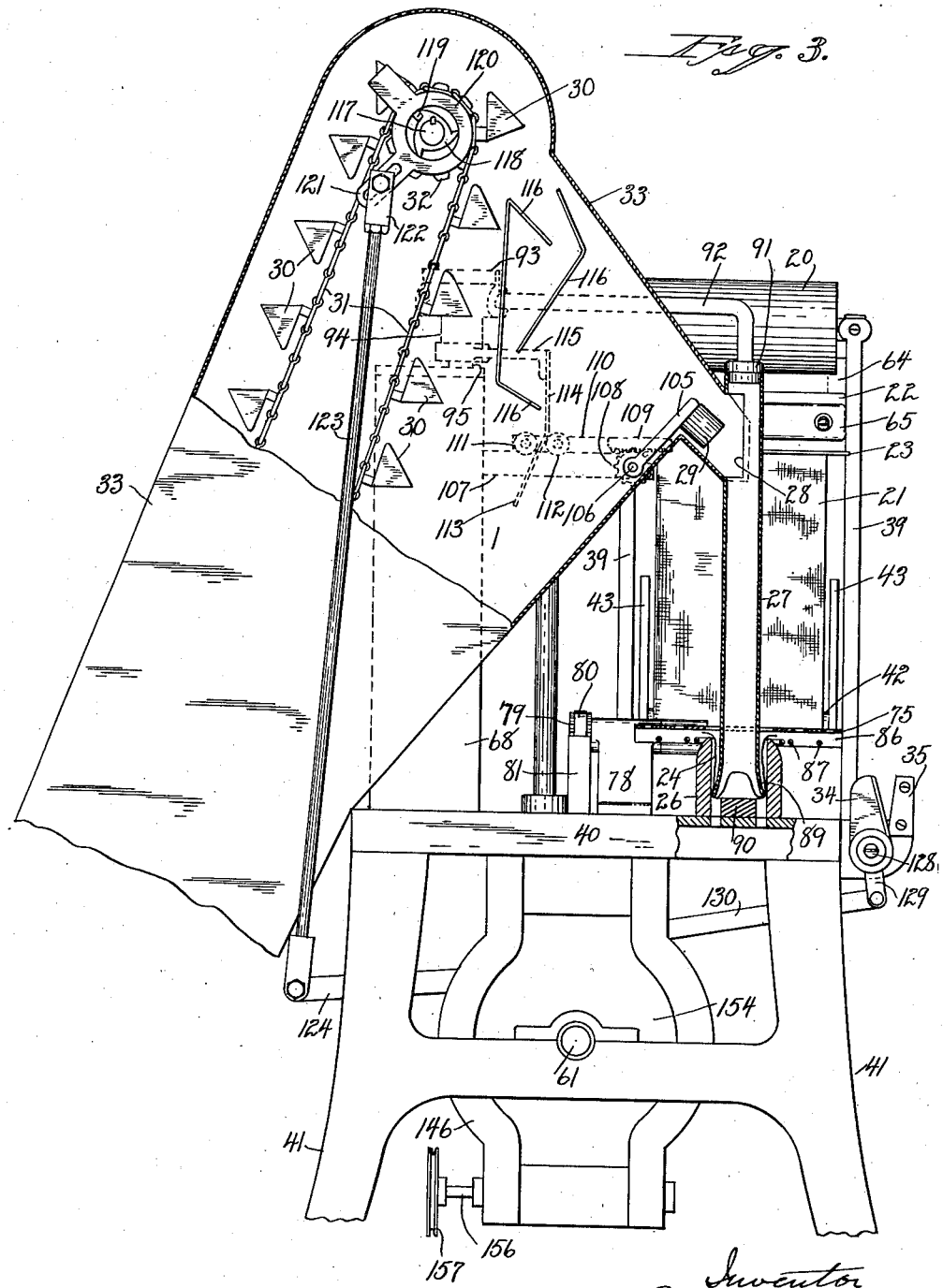

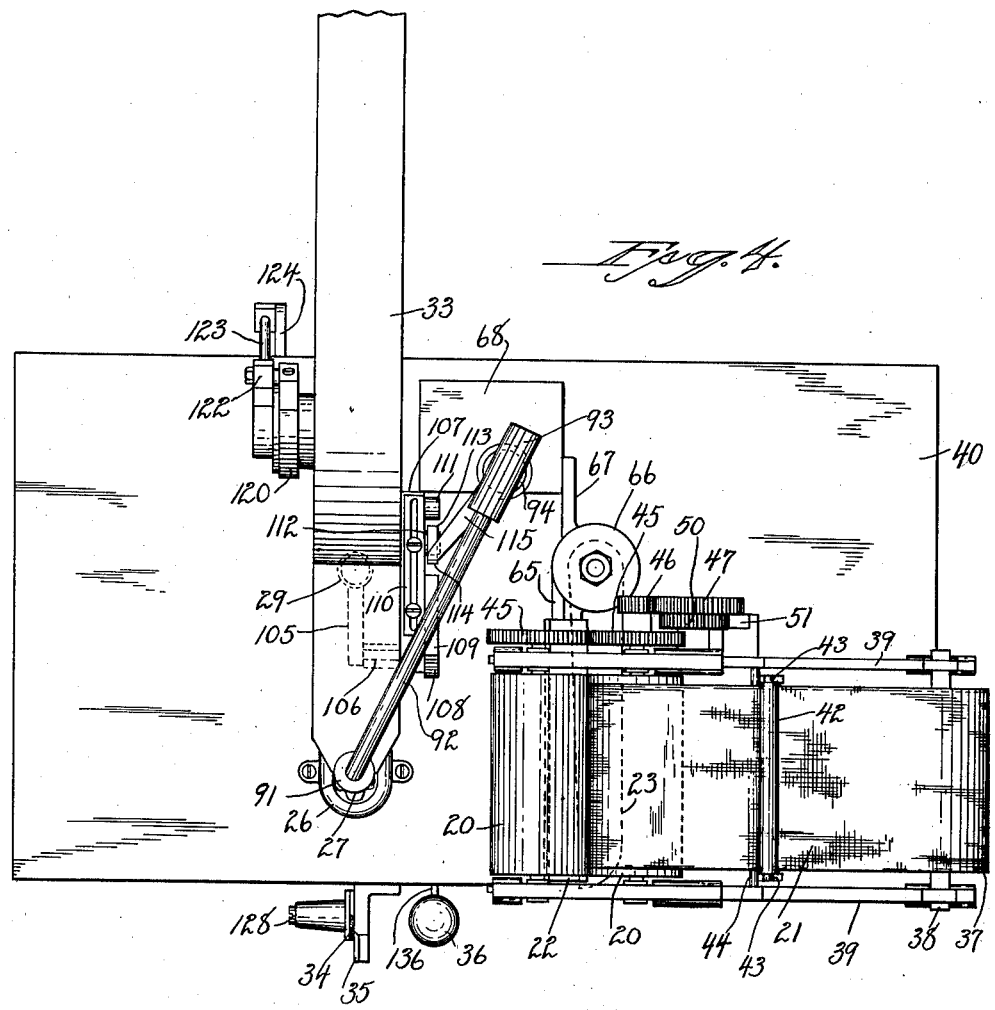

Nov. 24, 1925.
J. PIERCE
1,563,106
TEA BALLING MACHINE
Filed Aug. 7, 1924     8 Sheets-Sheet 5
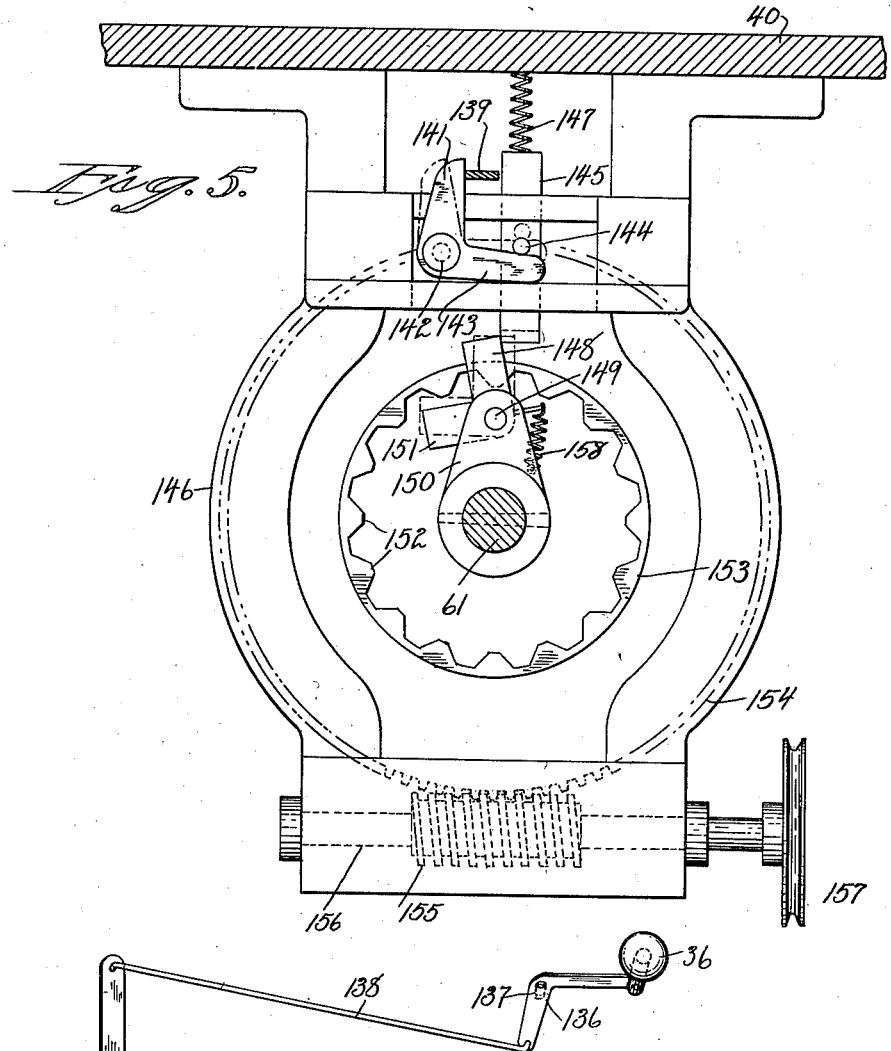
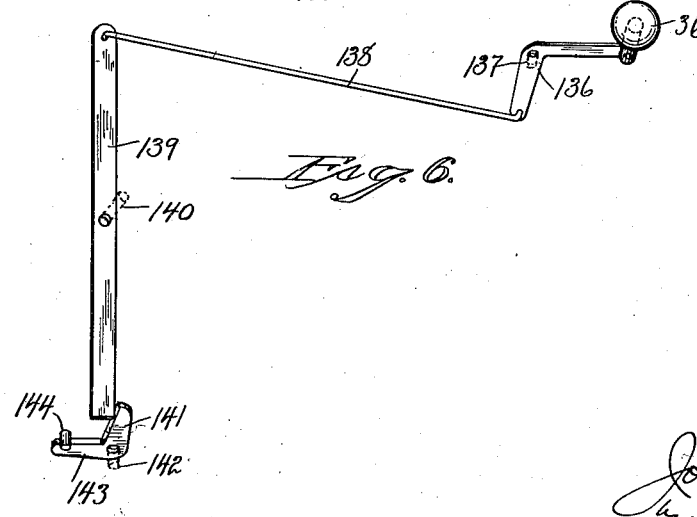

Nov. 24, 1925.
J. PIERCE
1,563,106
TEA BALLING MACHINE
Filed Aug. 7, 1924        8 Sheets-Sheet 6
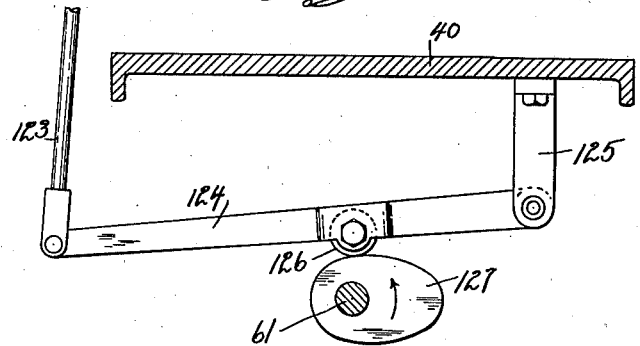
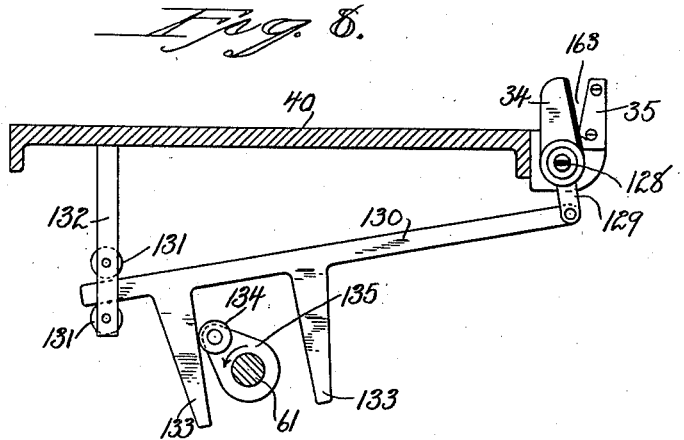
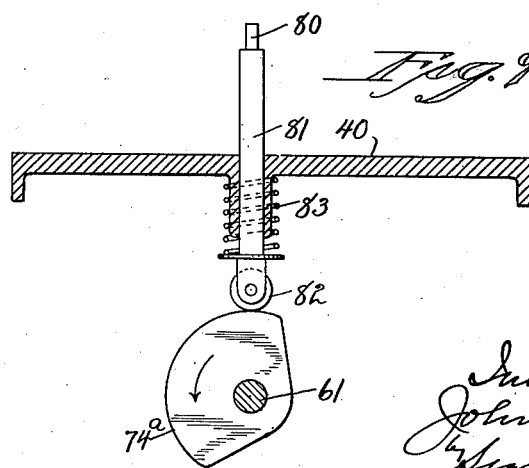

Nov. 24, 1925.
J. PIERCE
1,563,106
TEA BALLING MACHINE
Filed Aug. 7, 1924  8 Sheets-Sheet 7
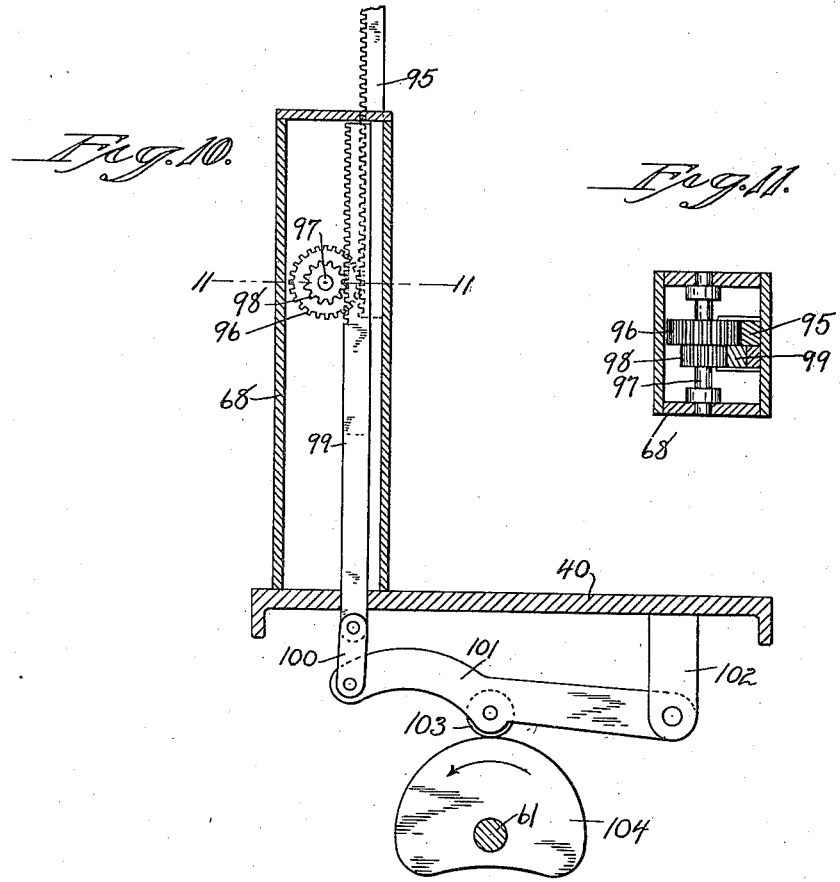
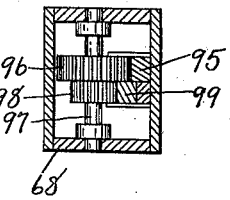
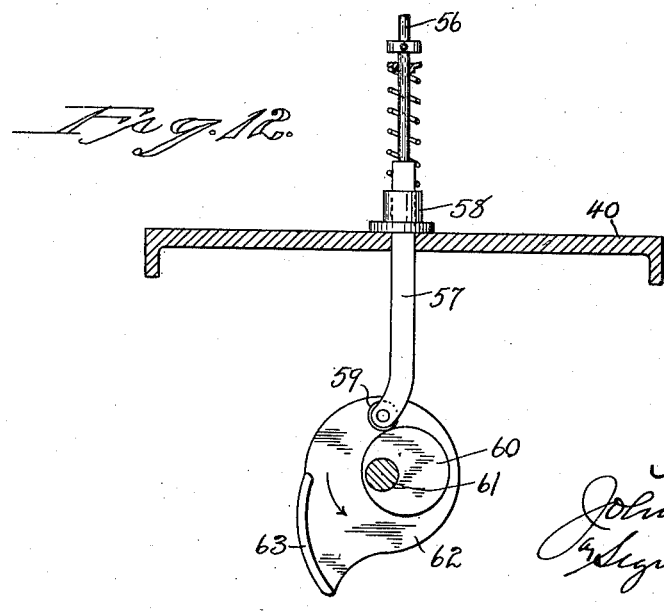

Nov. 24, 1925.
J. PIERCE
TEA BALLING MACHINE
Filed Aug. 7, 1924     8 Sheets-Sheet 8
1,563,106
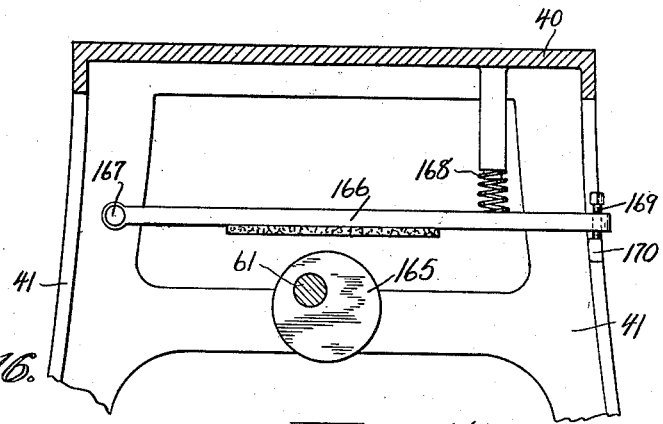
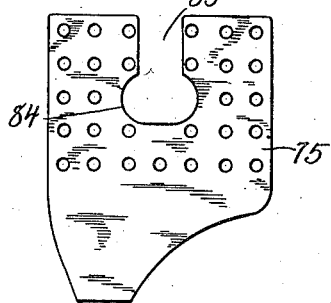
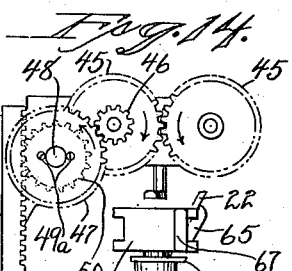
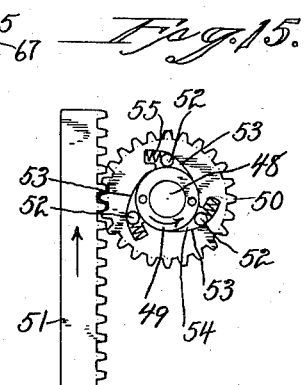
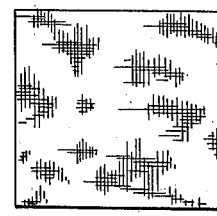
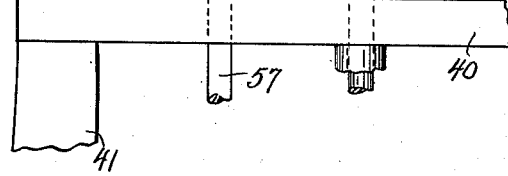
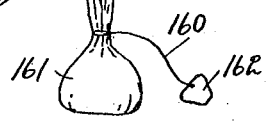
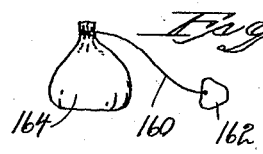

Patented Nov. 24, 1925.

1,563,106

UNITED STATES PATENT OFFICE.

JOHN PIERCE, OF SOUTHBURY, CONNECTICUT.

TEA-BALLING MACHINE.

Application filed August 7, 1924. Serial No. 730,764.

*To all whom it may concern:*

Be it known that I, JOHN PIERCE, a citizen of the United States, residing at Southbury, in the county of New Haven and State of Connecticut, have invented a new and useful Improvement in Tea-Balling Machines; and I do hereby declare the following, when taken in connection with the accompanying drawings, and the characters of reference marked thereon, to be a full, clear, and exact description of the same, and which said drawings constitute part of this application, and represent, in—

Fig. 1 a view in front elevation of a tea-balling machine constructed in accordance with my invention, the parts being in their normal positions, preparatory to being started for the cycle required for the production of a tea-ball.

Fig. 2 a view thereof in left-hand elevation, with the conveyor-housing partly broken away and partly in section, the parts being shown in the same position as in Fig. 1.

Fig. 3 a view thereof corresponding to Fig. 2, but showing the parts in the positions due to them when the plunger is at the limit of its downward movement.

Fig. 4 a plan view of the machine, with the parts in their normal positions, as in Fig. 1.

Fig. 5 a broken, sectional view, on an enlarged scale, on the line 5—5 of Fig. 1.

Fig. 6 a detail, perspective view, showing the train of parts between the starting-manual and the clutch-lever.

Fig. 7 a broken view in transverse section, on the line 7—7 of Fig. 1, and showing the conveyor-cam and its immediate connections.

Fig. 8 a view in transverse section on the line 8—8 of Fig. 1, showing the trimmer-operating mechanism.

Fig. 9 a view in transverse section on the line 9—9 of Fig. 1, showing the fly-operating mechanism.

Fig. 10 a view in transverse section on the line 10—10 of Fig. 1, showing the plunger-operating mechanism.

Fig. 11 a detail view in horizontal section on the line 11—11 of Fig. 10.

Fig. 12 a view in transverse section on the line 12—12 of Fig. 1, showing a detail of the gauze-feed mechanism.

Fig. 13 a view in transverse section on the line 13—13 of Fig. 1, showing the checking-mechanism.

Fig. 14 a broken view in rear elevation of the gauze feeding-and-cutting mechanism.

Fig. 15 a broken, detail view, showing the gauze-feed rack and the gauze-feed ratchet-pinion.

Fig. 16 a detached, plan view of the gauze-fly plate.

Fig. 17 a detached, plan view of one of the gauze blanks.

Fig. 18 a detached view of a tea-ball prior to the trimming operation.

Fig. 19 a similar view of the completed tea-ball,—the product of the product of the machine.

My invention relates to an improvement in "tea-balling" machines, as machines for measuring and confining small, predetermined measures or portions of tea in gauze bags are called, the object of my present invention being to produce an easily-operated and effective machine having a large capacity for work, and constructed with particular reference to automatically supplying to the mechanism the gauze required for the bags.

With these ends in view, my invention consists in a tea-balling machine characterized by its provision, in addition to other essential features, of means for automatically feeding gauze blanks at predetermined intervals between its die and plunger, prior to the descent of the plunger into the die.

My invention further consists in a machine characterized as above and having further details of construction and combinations of parts as will be hereinafter described and pointed out in the claims.

The main features of my improved machine, as herein illustrated, are a pair of feed-rolls 20 for intermittently feeding a gauze strip 21 between knives 22 and 23, which act to cut the strip into bag-blanks 24 after the end of the strip has been introduced into an oscillating fly 25, in which the said bag-blanks are swung over the top of a hollow, upstanding die 26 located directly under the lower end of a hollow plunger 27 having a feed-opening 28 through which a predetermined quantity or measure or portion of tea is fed into the plunger from an oscillating measuring-cup 29, to which the tea is fed by buckets 30 on a chain-conveyor 31 intermittently driven by a sprocket-wheel 32 enclosed in a flat conveyor-housing 33. Another main feature of the machine is a pair of trimming-knives 34 and 35 located adjacent to a starting-manual 36, which is depressed to start the machine for each cycle of its operation.

Having thus identified the main features of my improved machine, I shall proceed to describe the same in detail.

The roll of gauze 37 is carried by a spindle 38 removably mounted in slotted brackets 39 upstanding from a machine-table 40 supported on legs 41. From the roll 37 the gauze-strip 21 is passed under a tension-roller 42 free to play up and down in slotted guides 43, whereby the slack in the gauze is taken up. The gauze-strip thence runs upward over an idler 44, over the right-hand feed-roll 20 and thence downward between it and the left-hand feed-roll 20.

For intermittently driving the two feed-rolls 20, they are provided with intermeshing gear-wheels 45, while the right-hand roll is also provided at its opposite end with a pinion 46 driven by a gear-wheel 47 mounted upon a stud 48 (Fig. 15) and furnished with a collar 49 secured to it by screws 49ª encircled by a ratchet-pinion 50 driven by a vertical rack 51. For coupling the ratchet-pinion 50 with the shaft 48 for turning the latter step by step in one direction, I employ three rollers 52 respectively co-acting with three equal cam-surfaces 53 formed upon the inner periphery of the said pinion 50 and riding upon the collar 49 aforesaid, the said rollers being normally crowded into the wedge-shaped pockets 54 formed, between the said surfaces 53 and the periphery of the collar 49, by small helical springs 55. When the rack is moved upward, the ratchet-wheel 50 turns idly with respect to the collar 49, which remains stationary. On the other hand, when the ratchet moves downward, the rollers 52 are pinched between the periphery of the collar 49 and the cam-surfaces 53, with the effect of coupling the pinion 50 with the collar 49 and hence with the shaft 48, which is turned with the effect of driving the roll 47, pinion 46, and hence the feed-rolls 20 the distance required for feeding a single bag-length of gauze from the roll 37 into the oscillating fly 25.

For the operation of the rack 51, its lower end is connected by a rod 56 (Fig. 12) with the upper end of a plunger 57 in a bearing 58 on the table 40, the lower end of the said plunger being furnished with a roller 59 riding upon an eccentric 60 on the main-shaft 61 of the machine. The said eccentric 60 lifts the plunger 57 for idly advancing the ratchet-pinion 50, while, to insure the downward or feeding stroke of the plunger, I employ a plate 62 mounted on the said shaft 61 and furnished with a cam-flange 63, which rides over and engages with the roller 59, and positively draws down the plunger 57, in case it does not descend by gravity.

When the rolls 20 have fed the gauze-strip 21 through the vertical guideway 64 into the fly 25 to the proper extent, the fed end of the strip is cut off by the knives 22 and 23 aforesaid. The fixed knife 22 is secured in an inclined position to a forward extension 65 of a circular head 66 having a rearwardly-extending brace-arm 67 secured to the rectangular plunger-housing 68 (Fig. 4). The said head 66 forms a bearing for the upper end of a vertically-arranged, oscillating shaft 69 also having bearing in the table 40 and provided at its lower end with a head 70 having an arm 71 carrying a roller 72 coacting with a gauze-cutting cam 73 on the main shaft 61 and also with a knife-opening cam 74 mounted upon the said shaft on the opposite side of the roller 72 and serving to swing the knife 23 into its open position.

The fly, designated in its entirety by the numeral 25, comprises a perforated plate 75 secured to a head 76 (Fig. 1) mounted at its lower end upon a shaft 77 journaled in a bearing 78 upstanding from the table 40. At its rear end, the shaft 77 carries a pinion 79 meshed into by a rack 80 fastened to a vertically-arranged plunger 81 mounted in the table 40 and forked at its lower end for the reception of a roller 82 riding upon the periphery of the cam 74 aforesaid. A helical spring 83 interposed between the lower face of the table 40 and the fork on the lower end of the plunger 81, exerts a constant effort to keep the roller 82 in engagement with the periphery of the cam 74, and, therefore, to swing the fly from its upright or receiving to its horizontal or delivering position. The perforated plate 75 of the gauze-fly (Fig. 16) has a central clearance-opening 84, from which a clearance-passage 85 leads to its outer edge. A horizontal bar 86, secured to the inner face of the plate, near the lower end thereof, carries a plurality of parallel retaining-wires 87 spaced apart, as shown in Fig. 2, the two central wires being outwardly bowed, as at 88, to clear the opening 84 in the plate 75. The space between the plate 75 and the wires 87 is just wide enough to permit the fed end of the gauze-strip 25 to enter between them. The perforations in the plate 75 equalize the air-pressure and prevent the gauze from being forced through the openings 84 and 85 thereof.

After the end of the gauze-strip 21 has been fed into the upright fly and cut off by the knives 22 and 23, the fly is swung, as just above described, from its vertical into its horizontal position, as shown by broken lines in Fig. 1 and full lines in Fig. 3, whereby the central portion of the bag-blank carried by it is laid over the top of the hollow die 26, which is bolted to the table 40.

The hollow plunger 27 now descends into the die 26, passing through the opening 84 in the plate 75 of the fly and between the outwardly-bowed wires 87 thereof, carrying with it the sheet of gauze thus formed into a cup (Fig. 3). As shown, the lower end of the plunger is flared as at 89 and the bottom of the die provided with a cushion 90. The fly is now swung back into its vertical or gauze-receiving position to await the next succeeding actuation of the feed-rolls, the retirement of the fly with the plunger still in the die being permitted by the provision of the plate 75 with the clearance-passage 85 and by the spacing apart of the central pair of wires 88.

The upper end of the plunger 27 is secured to a head 91 carried by the downwardly-bent end of a horizontal arm 92, the opposite end of which is entered, with capacity for adjustment, into the overhanging clamp 93 of a cap 94 mounted upon the upper end of a rack-bar 95 (Fig. 10) entering the upper end of the housing 68 (Fig. 11), in which it is guided and reciprocates. The said rack 95 is meshed into by a gear 96 on a horizontal shaft 97, journaled at its ends in the end-walls of the housing and also carrying a pinion 98 driven by a rack-bar 99 located within the housing and extending downwardly, through the table 40 for connection by a link 100 to the rear end of a lever 101 hung by its opposite end in a bracket 102 depending from the table 40. The said lever carries a roller 103 riding upon a cam 104 on the main-shaft 61. Under this construction, the said cam 104 serves to lift the hollow plunger 27 which descends by gravity. By employing two racks and connecting them by pinions 96 and 98 of different diameters, the relatively small movement of the rack 99 is multiplied in the rack 95 for lifting the plunger 27 above the die 26 to the height required for ample hand-room for the operator.

When the said plunger is at the limit of its depressed position, as shown in Fig. 3, its charging-opening 28 is brought into position to receive a measured amount of tea from the oscillating measuring cup 29, which is mounted upon an arm 105 secured to one end of a short shaft 106 journaled in a horizontal guide-bar 107 and having its opposite end furnished with a pinion 108 meshed into by a horizontal rack 109 located at the forward end of a slide 110 moving back and forth upon the said guide-bar. At its rear end, the slide is furnished with two rollers 111 and 112, receiving between them the bent arm 113 of an actuating plate 114 fastened to a bracket 115 in turn secured to the upper end of the rack-bar 95 (Figs. 2, 3 and 4).

The said measuring cup 29 is located within the flat, upright housing 33 already mentioned, the bar 107 being applied to the outer face of one of the side-walls of the same.

When the measuring cup 29 is in its receiving position, as shown in Fig. 2, it receives a charge of tea, deflected upon it from a series of baffle-plates 116 located between the side-walls of the housing 33 and designed to cause the tea to gently flow into the measuring cup, after its discharge from one of the buckets 30 upon the uppermost of these plates.

The chain-conveyor 31, carrying the buckets 30, is intermittently actuated by means of a sprocket 32 (Fig. 2) mounted upon one end of a shaft 117 journaled in the upper end of the conveyor-housing 33 and carrying a three-point ratchet-wheel 118, the points of which are successively engaged by a spring-actuated pawl 119 radially mounted in an oscillating driving-ring 120 having a slotted arm 121 by means of which it is adjustably connected with a head 122 at the upper end of an actuating-rod 123 (Fig. 7), the lower end of which is connected with a lever 124, the opposite end of which is hung in a bracket 125 depending from the table 40. A roller 126 in the lever 124 rides upon a cam 127 mounted on the main-shaft 61 and serving to intermittently actuate the conveyor-chain for moving the same sufficiently each time to cause one of the buckets 30 to discharge its contents of tea upon the baffle-plates 116.

The knives 34 and 35 (Figs. 1, 2, 3 and 8) employed for trimming the neck of the tea-ball, are located within a hand-breadth of the starting-manual 36, the fixed knife 35 being fastened to the forward edge of the table 40 and the movable knife 34 being hung upon a stud 128 and having a depending arm 129 connected with a sliding lever 130, the opposite end of which rides between two rollers 131 in a bracket 132, depending from the table 40. The lever 130 has two corresponding arms 133 alternately engaged by a roller 134 in a crank 135 on the shaft 61.

The manual 36 (Figs. 1 and 6), employed for starting the machine, is mounted upon the horizontal arm of a bell-crank-lever 136, hung on a pivot 137 in the table 40 and connected by a rod 138 with a lever 139 hung on a stud 140 and engaged at its outer end with the arm 141 of a bell-crank-lever hung on a stud 142 and having its opposite arm 143 arranged to engage with a pin 144 mounted in a slide 145 (Fig. 5), in the upper portion of a clutch-housing 146 depending from the under-face of the table 40 at the left-hand end of the machine. A spring 147 normally holds the slide 145 in its depressed position. The projecting lower end of the slide 145 extends into the path of the outwardly extending arm 148 of a coupling-dog rocking upon a pivot 149 in a crank 150 pinned to the main-shaft 61. The other arm 151 of the said dog is adapted to engage the respective teeth of a series of internal teeth 152 formed within a driving-ring 153 secured to one face of a worm-wheel 154 turning loosely upon the main-shaft 61 and driven by a worm 155 on a worm-shaft 156 journaled in the bottom of the housing 146 and carrying a pulley 157 connected with any convenient source of power. The worm-shaft 156, worm 155, worm-wheel 154 and the driving-ring 153 will be continously driven. A spring 158, attached to the coupling-dog above described, tends to engage the arm 151 thereof, with one of the teeth 152 of the continuously-driven ring 153.

In describing the operation of my improved machine, it will be convenient to assume that the parts thereof are in the positions shown in the drawings (excepting Fig. 3) and that a gauze-blank 24 has been cut off from the fed end of the gauze-strip and is confined in the fly in the upright position thereof. It must also be assumed that the measuring-cup is full of tea. The operator now presses down upon the starting-manual 36, bringing the bell-crank-lever 136, rod 138 and lever 139 into play for rocking the bell-crank on the stud 142 (Fig. 6), whereby the arm 143 of the said bell-crank is lifted against the pin 144 with the effect of lifting the slide 145, against the tension of the spring 147, so as to clear the lower end of the said slide from the projecting arm 148 of the two-armed coupling-dog. The spring 158 at once asserts itself to rock the coupling-dog into position for the engagement with the particular tooth 152 of the continuously-rotating ring 153, which happens to be passing at the time, whereby the said ring is coupled with the crank-arm 150 pinned to the main-shaft 61, causing the same to turn with the driving-ring, whereby the machine is started for the production of one tea-ball, after which it will be stopped.

In the timing of the machine, which is regulated by the relative positioning of the several cams upon the shaft 61, the crank-arm 135 is immediately brought into play for operating the knife 34, which would trim the neck of a tea-ball if the operator had one in readiness to insert between the two knives 34 and 35. The cam 74 now operates permissively to allow the spring 83 to assert itself and swing the fly from its upright to its horizontal position, whereby the bag-blank carried by it is positioned over the hollow die, as shown in Fig. 3. The cam 104 now operates, permissively, to allow the hollow plunger 27 to descend by gravity into the bottom of the die, whereby the gauze-blank is stripped from the fly and its central portion formed into a cup in the bottom of the die.

As the plunger 27 descends into the die, the actuating-plate 114, connected with it, acts through the roller 112 to push the slide 110 forward, whereby the measuring-cup 29 is lifted from its horizontal or receiving position and swung over into its inclined, delivery position, in which it is shown in Fig. 3, whereby the tea contained in it is discharged into the hollow plunger through the opening 28 therein, so that, by the time the plunger reaches the bottom of the die, and has folded the bag thereinto, the tea has gravitated down into the folded bag. The cam 74 now operates to positively lift the plunger 81 and hence to swing the fly 25 back into its upright gauze-receiving position. The cam 104 now operates to lift the hollow plunger 27, not only above the die 26, but sufficiently above the same to provide ample hand-room above the die for the operator. Just as soon as the hollow plunger starts to lift, the lower end of the actuating-plate 114 begins to co-act with the roller 111 to retract the slide 110, whereby the measuring-cup 29 is swung back into its horizontal tea-receiving position (Fig. 2).

The cam 127 now operates to impart another short, advance movement to the conveyor, whereby another bucket of tea is poured upon the baffle-plates 116, from which it falls into the measuring-cup 29. Meanwhile, the feed-rolls 20 have been actuated in feeding another length of gauze into the now upright fly 25 and the knife 23 has been actuated by the cam 73 in cutting off another gauze blank preparatory to the next cycle of operation of the machine. The cycle just now described is now terminated by the engagement of the projecting arm 148 of the two-armed coupling-dog with the lower end of the slide 145, whereby the dog is rocked on its center 149 and its arm 151 disengaged from the tooth 152 of the constantly-rotating ring 153 with which it has been engaged during the cycle now closing. The main shaft 61 stops, leaving the driving-ring and worm still turning. As stopped, the machine is in readiness for another cycle, with the gauze-blank in readiness in the fly and the measuring-cup filled with tea. As soon as the hollow plunger has been sufficiently raised to give her hand-room, the operator, using a piece of string 160, firmly ties the neck of the bag just made, producing the untrimmed tea-ball 161 shown in Fig. 18, with its string 160 and tag 162. The girl then lifts the said tea-ball out of the die and turning it into a horizontal position, places its neck in the V-shaped space 163 between the knives 34 and 35. As she guides the neck of the tea-ball into the V-shaped space 163, the palm of her right hand strikes the manual 36 and depresses the same for starting the machine for another cycle, the first effect being to cause the automatic movement of the knife 34 toward the knife 35, so as to trim the neck of the tea-ball, to form the finished tea-ball 164, shown in Fig. 19. The timing of the several elements of the machine is easily made so close that its operation in producing the tea-balls is very rapid, with no effort on the part of the girl operating the machine except to tie and remove the bags and place them for the trimming operation.

To prevent the weight of the hollow plunger 27 and connecting parts from turning the shaft 61 when the cam 104 is operating to permit the said plunger to descend by gravity, I provide the shaft 61 with an eccentric disc 165 intermittently engaging a pivotal brake-bar 166 hung upon a stud 167 in one of the table-legs 41, and forced toward the disc 165 by a helical spring 168. The brake-bar 166 is provided with a stop-screw 169 normally resting upon a lug 170 on the machine table-leg 41, as shown in Fig. 13.

I claim:

1. A tea-balling machine having a plunger and a die, means for supplying tea in predetermined amounts thereto, and means for automatically feeding bag-blanks at predetermined intervals horizontally between the said die and plunger prior to the descent of the plunger into the die, the said means including a fly constructed for the passage through it of the plunger.

2. A tea-balling machine having a plunger and a die, means for supplying tea in predetermined amounts thereto, a fly for introducing bag-blanks of gauze between the plunger and the die, means for feeding the end of a gauze-strip into the said fly when in its receiving position, and means for cutting a bag-blank from the end of the strip after the introduction thereof into the fly and before it reaches the die.

3. A tea-balling machine having a plunger and a die, means for supplying tea in predetermined amounts thereto, a fly for the introduction of a bag-blank horizontally between the plunger and the die, the said fly being located in the vertical plane when in its receiving position, means for feeding the end of a gauze-strip downward into the fly when in its receiving position, and means for cutting the strip between the said feeding means and the mouth of the fly.

4. A tea-balling machine having a plunger and a die, means for supplying tea in predetermined amounts thereto, a fly located in the vertical plane when in its receiving position and comprising means engaging the opposite faces of a gauze-blank for holding the same in its extended form, means for feeding the end of a gauze-strip into the said fly when in its receiving position, and means interposed between the said fly and feeding means for automatically severing the strip.

5. A tea-balling machine having a plunger and a die, means for supplying tea in predetermined amounts thereto, a fly located in the vertical plane when in its receiving position and comprising a perforated plate formed with an opening for the clearance of the plunger, means for feeding the end of a gauze-strip into the fly when in its receiving position, and means interposed between the said fly and feeding means for automatically severing the strip.

6. A tea-balling machine having a plunger and a die, means for supplying tea in predetermined amounts thereto, a fly located in the vertical plane when in its receiving position and comprising a perforated plate formed with an opening for the clearance of the plunger, and a plurality of wires to complement the confining action of the plate on the other side of the gauze-blank, means for feeding the end of a gauze-strip into the fly when in its receiving position, and means interposed between the said fly and feeding means for automatically severing the strip.

7. A tea-balling machine having a plunger and a die, means for supplying tea in predetermined amounts thereto, a fly located in the vertical plane when in its receiving position and constructed for the passage through it of the plunger when in its delivery position, a pair of feed-rolls located directly above the fly when in its receiving position for feeding the end of a gauze-strip down into it, and means located below the said feed-rolls for cutting off the end of the strip after the same has been inserted into the fly.

8. A tea-balling machine having means for introducing a predetermined amount of tea into a gauze bag-blank and for shaping the same into a tea-ball, means for trimming the neck of the tea-ball after the same has been tied, and a starting-manual for starting the machine, located adjacent to said trimming means for the automatic operation thereof at the beginning of a cycle of the machine's operation.

In testimony whereof, I have signed this specification.

JOHN PIERCE.